United States Patent [19]

Jennings

[11] 4,298,038
[45] Nov. 3, 1981

[54] TECHNIQUE AND DEVICE FOR MEASURING FLUIDS INCLUDING FINGER VALVE AND FILLER MECHANISM

[76] Inventor: J. Thomas Jennings, 5 Hickory Rd., Short Hills, N.J. 07078

[21] Appl. No.: 77,642

[22] Filed: Sep. 21, 1979

[51] Int. Cl.³ .......................................... G01F 11/26
[52] U.S. Cl. ........................................ 141/2; 141/18; 141/98; 222/158; 222/437; 222/454; 222/475; 251/4; 251/336
[58] Field of Search ................... 222/1, 158, 318, 388, 222/395, 437, 441, 454, 455, 456, 457, 475, 482, 494, 517, 518; 251/336, 303, 4; 73/426, 427, 428; 141/2, 18, 319, 320, 325, 98

[56] References Cited

U.S. PATENT DOCUMENTS

| | | |
|---|---|---|
| 236,997 | 1/1881 | Dodge . |
| 562,823 | 6/1896 | Heysinger ............................ 141/18 |
| 570,759 | 11/1896 | Law . |
| 697,830 | 4/1902 | Franc . |
| 1,009,550 | 11/1911 | Moys et al. . |
| 1,093,740 | 4/1914 | Stevenson . |
| 1,227,658 | 5/1917 | Prenosil . |
| 1,282,103 | 10/1918 | Moffat . |
| 1,373,535 | 4/1921 | Smith, Jr. . |
| 1,438,892 | 12/1922 | Boykin . |
| 1,865,269 | 6/1932 | Munday ........................... 222/517 X |
| 1,924,809 | 8/1933 | Schuelke et al. . |
| 2,017,209 | 10/1935 | Kennedy . |
| 2,091,929 | 8/1937 | Kappenberg . |
| 2,584,130 | 2/1952 | Huebl et al. . |
| 2,645,388 | 7/1953 | Hester . |
| 2,728,490 | 12/1955 | Scannell et al. ................. 222/454 X |
| 2,980,297 | 4/1961 | Tucci . |
| 3,058,633 | 10/1962 | Muhlhoff . |
| 3,187,965 | 6/1965 | Bourget ............................ 222/518 |
| 3,235,143 | 2/1966 | Goodrich . |
| 3,254,809 | 6/1966 | Breneman . |
| 3,347,420 | 10/1967 | Donoghue . |
| 3,396,875 | 8/1968 | Finch . |
| 3,401,840 | 9/1968 | McConnell et al. . |
| 3,451,446 | 6/1969 | Russell . |
| 3,750,915 | 8/1973 | Kearney . |
| 3,948,105 | 4/1976 | Johnson, Jr. . |
| 4,069,946 | 1/1978 | Flider ............................ 222/475 X |
| 4,079,859 | 3/1978 | Jennings ........................ 222/437 X |

Primary Examiner—Stanley H. Tollberg
Assistant Examiner—Fred A. Silverberg
Attorney, Agent, or Firm—Martha G. Pugh

[57] ABSTRACT

Technique and apparatus for measuring liquids and granular material comprises a combination including a measuring vessel attached adjacent to the top and communicating with the primary container through the modifying pour spout of the latter. The measuring vessel includes an outwardly directed dispensing mouth having a removable closure, and a second upwardly directed opening vertically aligned with the pour spout of the primary vessel. In a preferred embodiment, the modifying pour spout of the primary container serves as a handle for the combination. After the primary container is filled through a tube extended through the second opening of the measuring vessel, this opening is either sealed, or a manually-operable valve is interposed into the opening. The manually-operable valve may alternatively take the form of a flap valve, or a piston valve, either of which operates to open and close communication through the modifying pour spout between the measuring vessel and the primary container. Another alternative feature of the combination is a pinch-valve, interposed into the constriction between the base of the measuring vessel and the primary container, which opens by distorting when compressed between the thumb and finger, releasing excess fluid in the measuring vessel to flow back into the primary container.

13 Claims, 24 Drawing Figures

TECHNIQUE AND DEVICE FOR MEASURING FLUIDS INCLUDING FINGER VALVE AND FILLER MECHANISM

BACKGROUND OF THE INVENTION

This relates in general to techniques and apparatus for measuring liquids and granular materials dispensed from a primary container into a measuring vessel which may be integrally formed with or removably attached to the top of the primary container.

Such techniques and apparatus are disclosed and claimed in my U.S. Pat. No. 4,079,859 issued Mar. 21, 1978. The above-named patent discloses a combination in which the mouth of the primary container is extended to include an upwardly-opening modifying pour spout disposed at a slight angle in, say, a clockwise direction, to the principal axis of the primary container, serving to increase the pour angle of the latter. Enclosing or adjacent to the modifying pour spout is a measuring vessel which may include calibrated scales, which spout is integral with or secured to the mouth of the primary container. The measuring vessel has a dispensing mouth angled in, say, a counterclockwise direction from the principal axis of the primary container, so that a measured amount of fluid can be poured from the primary container into the closed measuring vessel when the primary container is tipped counterclockwise through a large vertical arc; and when the closure of the measuring vessel is removed, and the primary container is tipped through a lesser arc in the same direction, the measured amount can be completely dispensed from the measuring vessel without spillage from the primary container. The amount remaining in the measuring vessel can be measured on a calibrated scale when the primary container assumes its normal position; the excess can be poured back into the primary container when the latter is rotated through a specified clockwise angle; and the amount remaining in the measuring vessel is then measured on a special remeasure scale.

In accordance with the present invention, several modifications have been found to substantially improve the functioning of the device disclosed in my U.S. Pat. No. 4,079,859 supra. Because of the extended spout on the primary container, the device of my earlier design was found difficult to fill through the dispensing mouth of the measuring vessel without removing the measuring vessel from the primary container. Accordingly, I have made a second opening in the top of the measuring vessel which is generally aligned with the axis of the pour spout. In order to initially fill the primary vessel, a tube is interposed into the measuring vessel through the second opening. When the primary container is full, the filler tube is removed, and the second opening is sealed.

An alternative to capping or sealing the second opening is to place a manually-operable valve in the opening. This may either take the form of a flap-valve which moves rotatably in the opening to open and closed positions, or a piston valve which is moved in an axial direction into or out of closed position.

A pour and measure device including such a valve provides a substantial advantage over the design of my prior patent, in that once the valve is closed, fluid can be dispensed from the mouth of the measuring vessel tipped at any angle, without spilling the contents of the primary container into the measuring vessel. Thus, the angular relationship between the walls of the measuring vessel and the axis of the primary container is no longer critical, and the shape of the measuring vessel may be modified to be more pleasing in appearance, and to hold a larger volume of fluid. The shape being more nearly conventional, the device is easier and cheaper to make.

I have found that still another modification, either used separately or in combination with those already mentioned, improves the functioning of the measuring device. I have interposed a pinch-valve into the constriction between the lower end of the measuring vessel and the primary vessel, so that in order to return excess liquid from the measuring vessel into the primary container, it is merely necessary to distort the pinch-valve between the thumb and finger, permitting a desired amount to drain back.

These and other objects, features and advantages will be better understood from a study of the drawings and the detailed description hereinafter.

SHORT DESCRIPTION OF THE DRAWINGS

FIGS. 10, 11, 12 and 13 are fragmentary showings of the combination including the measuring device of FIGS. 8 and 9, of rounded contour, but with the piston-valve of FIG. 6 substituted for the flap-valve. FIG. 10 shows the measuring vessel in position to be filled from the primary vessel; in FIG. 11, in normal upright position, FIG. 12, in pour-out position from the measuring vessel; and FIG. 13, in remeasure position, respectively.

DETAILED DESCRIPTION OF THE INVENTION

Figure 1:
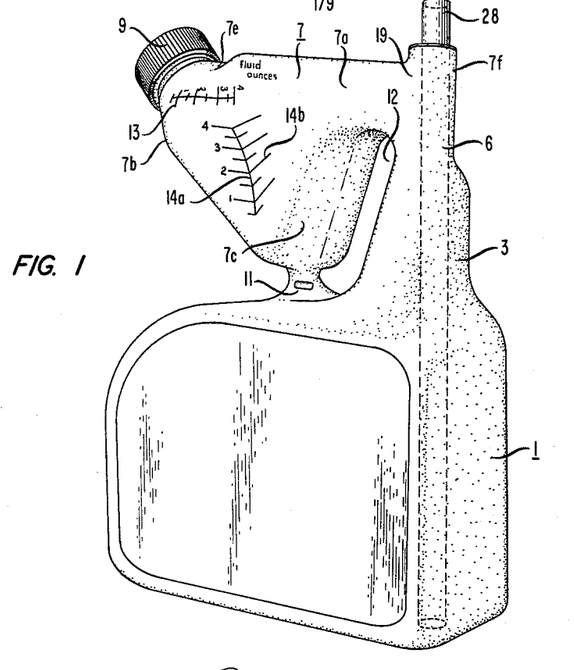
FIG. 1 shows in perspective a device for measuring fluids including a primary container and a measuring vessel fixed to the top of the primary container, wherein the measuring vessel has one opening for dispensing fluid, closed by a conventional closure, and a second opening vertically aligned with the principal opening of the primary container, in which a tube has been interposed for filling purposes.

Referring to FIG. 1, there is shown, in perspective, a combination primary container 1 and measuring vessel 7 formed of any of the materials well-known in the art for such purpose, such as glass, or plastic which may be high density polyethylene or polypopylene, constructed to be filled by a special filling tube 18.

In the present illustrative embodiment, the lower body of the container 1 is of modified rectangular form with rounded corners, roughly 6½ inches (16½ cm.) long, 3⅜ inches (8.8 cm.) wide and 6⅝ inches (16.5 cm.) high. The container mouth 3, which in the present embodiment is about 1-11/16 inches (4.3 cm.) in inner diameter, forms the base of a vertically extended tapered spout 6 about 3⅞ inches (9.8) cm.) above the mouth 3 which terminates at its upper end in filler opening 7f, which is ⅞ inch (2.2 cm.) in inner diameter across the opening, the rim being raised about ¼ inch (0.7 cm.) above the flat top 7a of triangularly shaped measuring vessel 7. The latter is of the general form disclosed in my U.S. Pat. No. 4,079,859 issued Mar. 31, 1978. The top 7a measures about 5½ inches (14½ cm.) overall across and 2⅜ inches (6.2 cm.) wide at the center, terminating at the end opposite to 7f in a dispensing spout 7e, having its axis directed outwardly at an angle of about 45° with the principal plane of top 7a. The dispensing mouth 7e, which is about one inch (2½ cm.) in inner diameter, is closed by a conventional closure 9 which may be of the same or similar material as the vessel 7. The underside 7b of the measuring vessel 7, forms a counterclockwise angle of roughly 45° with the principal axis of the primary container 1, and extends downward and inward about 4 inches (10 cm.) from dispensing mouth 7e, terminating at its lower end in a closed constriction 11 about ½ inch (1 cm.) wide and ⅜ inch (½ cm.) thick. An elongated eliptical opening 12, approximately 2⅜ inches (7 cm.) long and ¾ inch (2 cm.) wide, is cut between one side 7c of the measuring vessel 7 and the spout 6, forming therein a handle or hand-hold, the eliptical opening 12 having a principal axis about 2¾ inches (7.0 cm.) long, which forms a clockwise angle of about 10° with the principal axis of the container 1. Above eliptical opening 12 there is provided an internal opening 19 between the spout 6 and the triangular measuring vessel 7 about ⅞ inch (2.2 cm.) wide.

For convenience, as described with reference to my U.S. Pat. No. 4,079,859, supra, the measuring vessel 7 may have inscribed on its major surface calibrated scales. The scale 13 is disposed to read the liquid level when the measuring vessel 7 is tipped in a direction to pour out through the dispensing spout 7e, and may be calibrated in either fluid ounces or liters, or any other convenient scale. Scales 14a and 14b are respectively disposed to measure the fluid remaining in the measuring vessel 7 when the container 1 is in its normal upright position, and when it has been tipped back through a clockwise angle for pouring back the excess fluid into the container 1 through the opening 19, spout 6 and opening 3.

Figure 2:
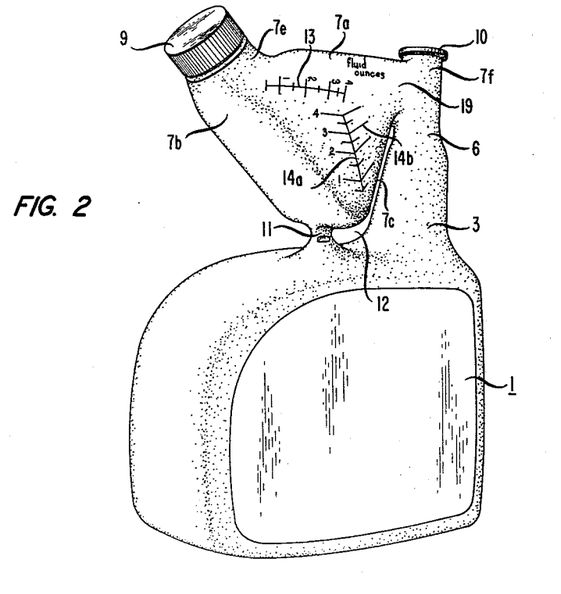
FIG. 2 shows the device of FIG. 1 wherein the filler tube has been removed, and the filler opening sealed.

A particular feature of the present embodiment is that the opening 7f is substantially aligned with the mouth 3, so that in the initial filling procedure, the bottle can be readily filled with liquid through the opening 7f, or alternatively, a filler tube 28 can be extended in through opening 7f, spout 6 and the opening 3 to fill the primary container 1. FIG. 2 shows the combination of FIG. 1 after filler tube 18 has been removed, and the opening 7f sealed with a conventional closure 10 of polypropylene, or similar material.

Instead of sealing the filler opening 7f with a conventional closure or cap 10, as indicated in FIG. 2, I have conceived the idea of interposing into the opening 7f a valve which is manually operated to assume open and closed positions. This can either take the form of a piston-valve 17 of the type shown in combination with the measuring vessel in FIGS. 3, 4 and 5 of the drawings, or alternatively, a flap-valve 18 of the type shown in the combinations of FIGS. 8 and 9.

Figure 3:
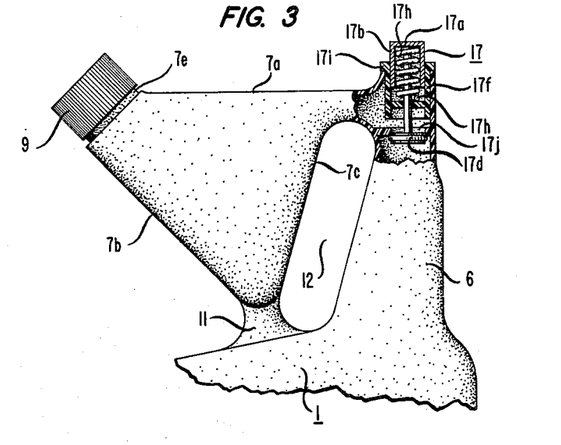
FIG. 3 is a fragmented showing of the combination of FIG. 2 in side-elevation, including the measuring vessel in which a manually-operable piston valve is interposed into the filler opening of FIG. 2, the valve being shown in closed condition.
Figure 6:
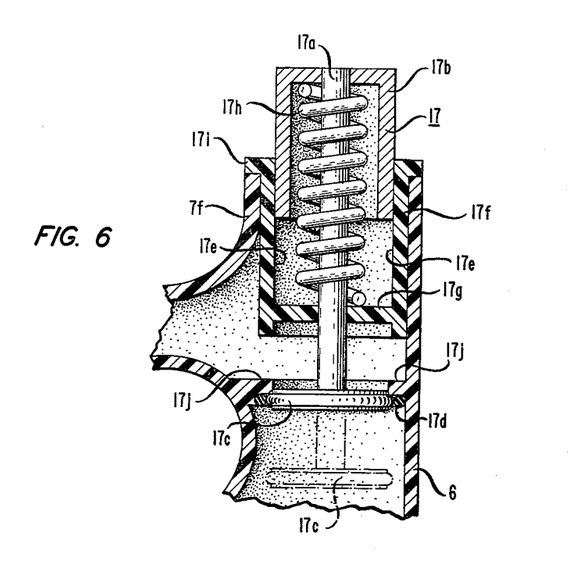
FIG. 6 is an enlarged detailed showing of the piston-valve in open and closed positions, mounted in the filler tube of the measuring vessel shown in FIGS. 3, 4 and 5.

FIG. 6 is a detailed showing of the piston-valve 17 of the present invention. This includes an innershaft 17a, of metal, or some other rigid material, about 1¾ inches (4½ cm.) long and ¼ inch (0.7 cm.) in diameter, which is axially mounted and terminates at one end in a metal disk valve-head 17c having an overall diameter of, say, ¾ inch (1.8 cm.), a thickness of, say, 5/32 inch, and a peripheral elastomer sealing ring 17d which seats in a recess in the disk 17c. The shaft 17a is force-fit or otherwise secured at its other end to a central opening in the inner end of a hollow cylinder 17b, of metal, such as brass, or some other rigid material. Cylinder 17b is ¾ inch (2 cm.) in outer diameter, ⅝ inch (1.6 cm.) in inner diameter, and 1⅛ inches (2.8 cm.) long. The hollow cylinder 17b is mounted to ride in slideable relation to-and-fro vertically inside of shallow cylindrical plastic sleeve 17e which has an inner diameter just sufficient to accomodate the outer diameter of 17b having a depth just less than the length of 17b, to an internal annular partition 17g near its lower end having a central opening which acts as a bearing for the to-and-fro motion to the shaft 17a. The latter moves against the compression of the coil-spring 17h, which surrounds the shaft 17a and is compressed between the partition 17g and the upper inner surface of hollow cylinder 17b. When the sleeve 17e is in place, the under edge forms a rim or flange 17i around the upper edge of outer sleeve 17f, flange 17i resting on and substantially flush with the upper edge of the opening 7f. (See FIGS. 3, 4 and 5). When the piston-valve 17 is manually depressed by pushing the hollow cylinder 17b down so that it is substantially flush with the upper edge flange 17i of opening 17f, the valve-head 17c moves downward to the position in which it disengages the annular valve-seat 17j, opening the upper end of the tube 6. FIGS. 3 and 4 show the piston-valve 17 in closed position in the tube 6, whereas FIG. 5 shows the piston-valve 17 in open position.

Figure 7:
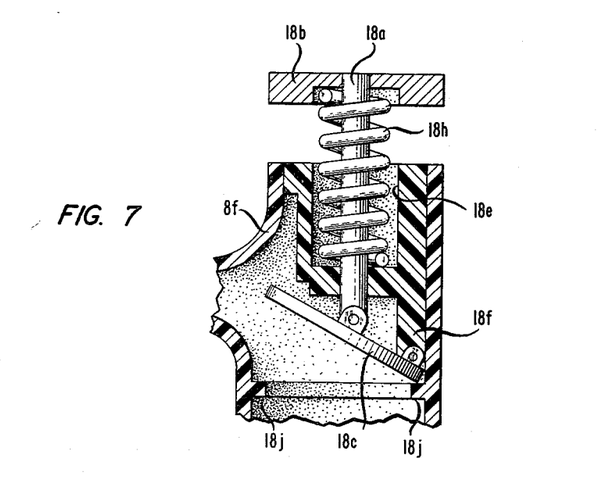
FIG. 7 shows the details of a manually operated flap-valve which can be substituted for the piston-valve shown in FIGS. 3, 4 and 5.

Referring to FIG. 7, there is shown, in detail, an alternative to the piston-valve shown in FIG. 6. This includes a central rod 18a which is fastened at its upper end to a disk 18b. Shaft 18a may comprise a flexible rod which is mounted in slideable relation at the center of a cup-shaped bearing 18e, the outer diameter of which is designed to fit snugly into the filler opening 8f of the measuring device 8, with the open-end up. Cup 18e has a downward projection 18f to the lower end of which is hinged the disk-shaped closure 18c to the center of the upper face of which is pivotally connected the lower end of flexible shaft 18a. Coil spring 18h surrounds contact rod 18a which moves downward against the tension of the spring 18h.

Figures 4, 5:
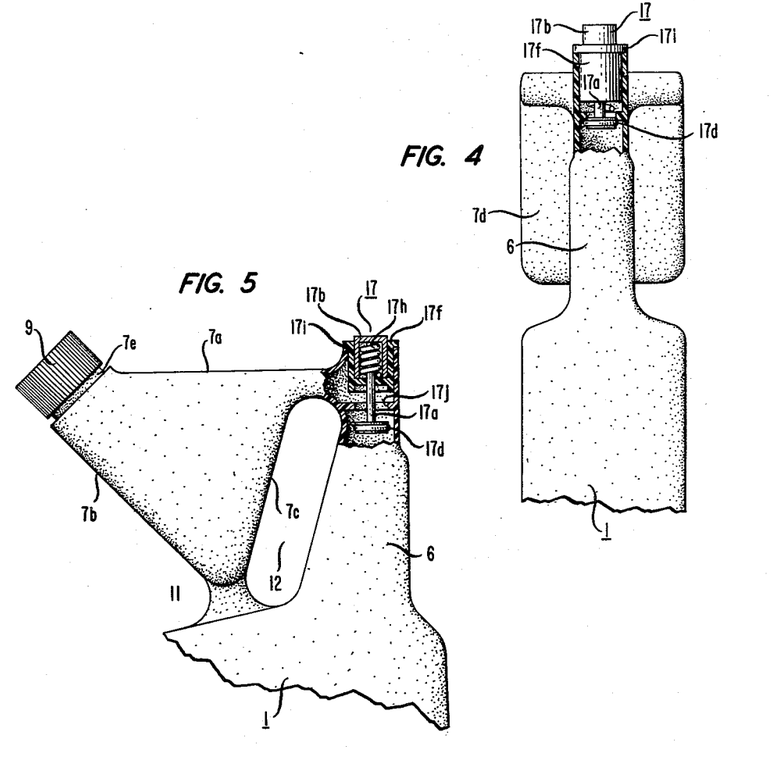
FIG. 4 is an end-elevation of FIG. 3 including the closed piston valve.
FIG. 5 is a showing in a side-elevation similar to FIG. 3 in which the piston valve is open.
Figure 8:
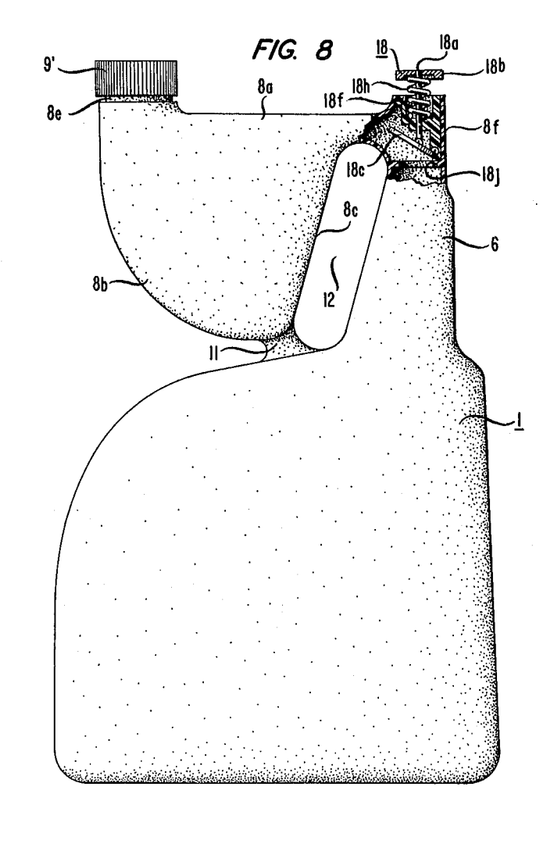
FIGS. 8 and 9 show, in side-elevation, a combination including a flap-valve in open and closed positions, respectively, in which the lower contour of the measuring device is rounded.
Figure 9:
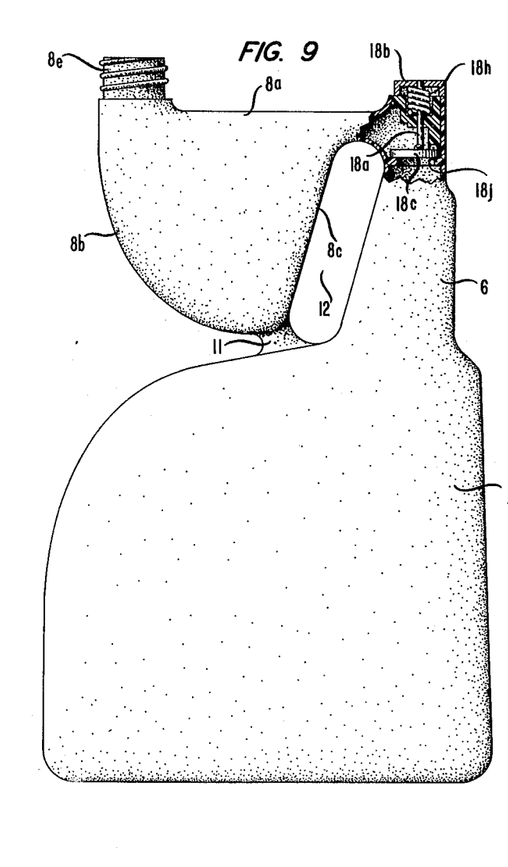

Flap valve 18 is shown installed in the filler opening 8f of the containers of FIGS. 8 and 9, in which the measuring vessel has a rounded body 8b as contrasted to the substantially flat, angularly-disposed wall 7b of FIGS. 3-5. It is seen from the drawing that the axis of the dispensing mouth 8e points vertically upward, as contrasted with the 45° angle of the dispensing mouth 7e of FIGS. 3-5. 8b is disposed tangential to the outer edge of mouth 8e, and has a substantial curvature as shown in FIGS. 8 and 9.

Referring to FIG. 8, the shape of the modified pour spout 6 and the handle opening 12 are substantially similar to those shown in the earlier figures. When the button 18b is pulled up against the tension of coil-spring 18h pulling on the flexible shaft 18a, the hinged closure 18c rotates upwardly about its hinge, opening the modified pour-spout 6. When the button 18b is depressed, the latter seats on the annular upper edge of 8f.

Figures 10, 11, 12, 13:
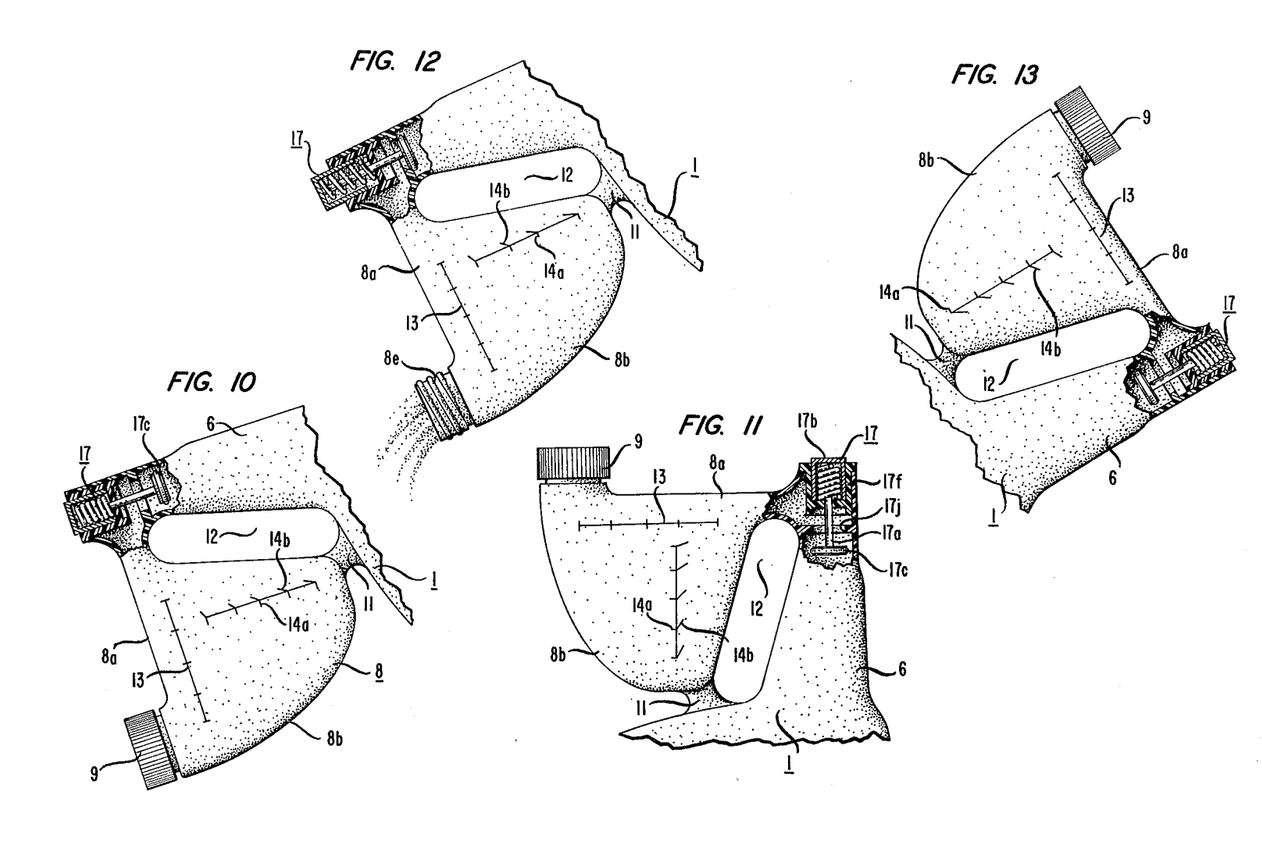

FIGS. 10, 11, 12 and 13 each show, in fragment, a container including a measuring vessel 8 of the shape shown in FIGS. 8 and 9, but in which a piston-valve 17 such as shown in FIG. 6 has been substituted for the flap valve 18 shown in FIGS. 8 and 9. The embodiment disclosed in FIGS. 10-13 includes measuring scales 13, and 14a, 14b. The scale 13 is calibrated in either liters or fluid ounces to measure the liquid poured out from the primary container 1 into measuring vessel 8 when rotated to the position shown in FIG. 10, with the valve 17 opened, and the closure 9 screwed in place, permitting liquid to flow into measuring vessel 8 through the modified pour spout 6. When the desired amount of fluid has been poured into the measuring vessel 8, the primary container is returned to the normal position as shown in FIG. 11; and the level of fluid poured out into the measuring vessel 8 is again measured against the scale 14a, which may be identical with scale 13, or alternatively, can be in different units.

The valve 17 is then closed, the closure 9 is unscrewed, and the container 1 is again rotated to completely pour-out the measured amount from the vessel 8. Because the valve 17 is closed, the angle through which the container is rotated to put it in pour-out position is not critical, and the measuring vessel 8 may be partially or completely emptied. If complete pour-out is not required, the container is then rotated in the opposite direction, as shown in FIG. 13, and the valve 17 is reopened, permitting the residue in the measuring vessel 8 to return to the primary vessel through the modified pour-spout 6, the amount remaining after pour-back being measured on the remeasure scale 14b.

Figure 14:
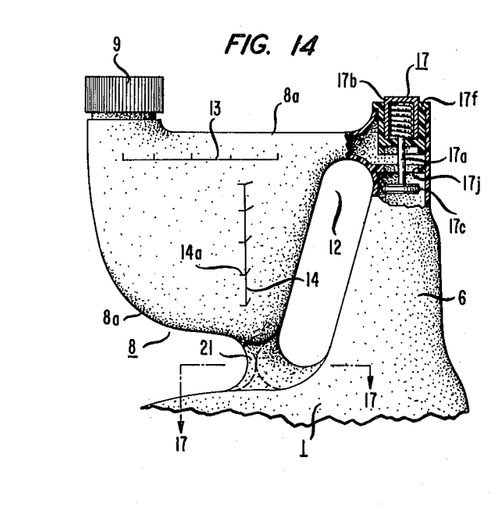
FIGS. 14 and 15 show, in side-elevation, a combination including a measuring vessel of rounded contour, in which the neck between the measuring vessel and the primary vessel includes a pinch-valve of internally-adhering plastic, in closed and open positions, respectively.
Figures 15, 16, 18:
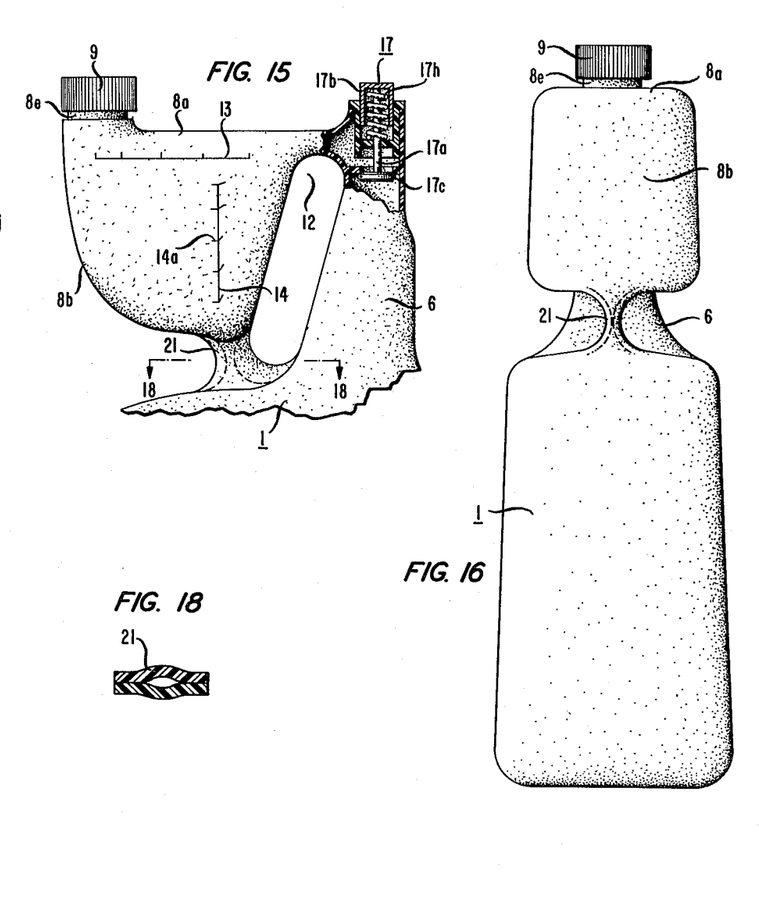
FIG. 16 shows the combination of FIG. 14 in end-elevation.
FIGS. 17 and 18 are sections of the pinch-valve as shown in FIGS. 14 and 15, along the planes indicated by the arrows through the neck, in closed and open positions, respectively.
Figure 17:
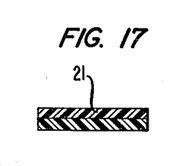

FIGS. 14, 15, and 16 show a container having a measuring vessel 8 with the rounded contour shown in FIGS. 8 through 11, in which the neck 21 comprise a plastic material which is self-adhering on the internal surfaces, so that when squeezed between the thumb and forefinger in a direction perpendicular to its principal axis, the inner walls of the plastic adhere, as shown in side elevation in FIG. 16, causing the valve to be closed. The neck 21 in closed condition is shown in cross-section in FIG. 17. FIG. 16 shows the container combination of FIG. 14 with neck 21 closed, in end-elevation. If the neck 21 is squeezed between the thumb and finger so that pressure is exerted tangentially to its principal axis, the latter is distorted, causing the pinch-valve to open. This is shown in cross-section in FIG. 18.

Thus, the container 8 is filled to the desired level by pouring out liquid from the primary container through the modified pour-spout 6. The level can be further adjusted either before or after pour-out from the spout 8e, by opening the pinch-valve in the neck 21 to allow the desired amount of liquid to trickle down into the primary container 1 until the liquid reaches a predetermined level on the scale 14a.

Figure 19:
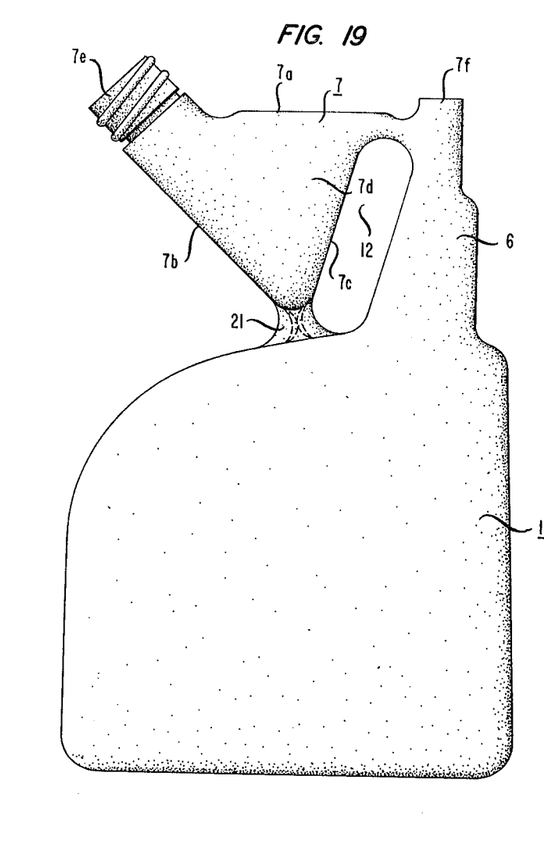
FIGS. 19 and 20 show, in side and end-elevations, the combination including the measuring vessel of triangular section substantially as indicated in FIG. 2, modified to include in open and closed positions a pinch-valve in the neck between the measuring vessel and primary container.
Figure 20:
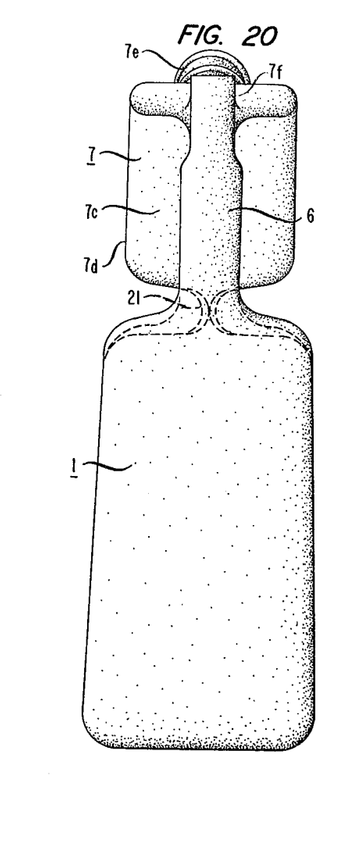

FIGS. 19 and 20 show a combination including the pinch-valve in neck 21 in open and closed position, installed in a measuring vessel 7 of the general triangular shape shown in FIG. 2.

Figure 21:
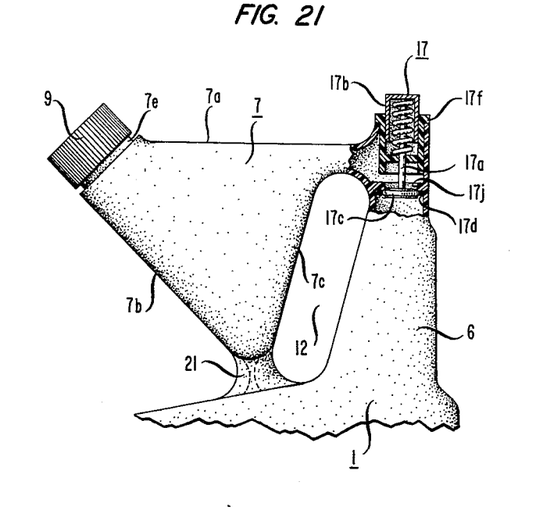
FIG. 21 shows the combination of FIG. 3 including the measuring vessel of triangular section, in which the filler opening includes a piston-valve, the measuring vessel modified to include a pinch-valve in the neck between the latter and the primary container.
Figure 22:
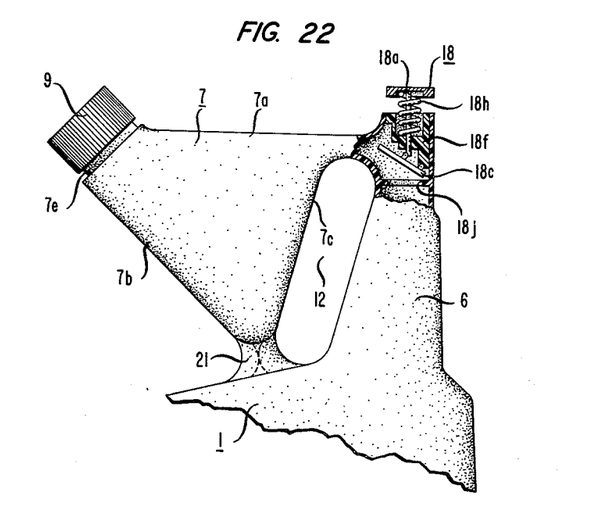
FIG. 22 shows the combination of FIG. 2 including the measuring vessel of triangular section in which the filler opening includes a flap-valve, and a pinch-valve is interposed in the neck between the measuring vessel and primary container.
Figure 23:
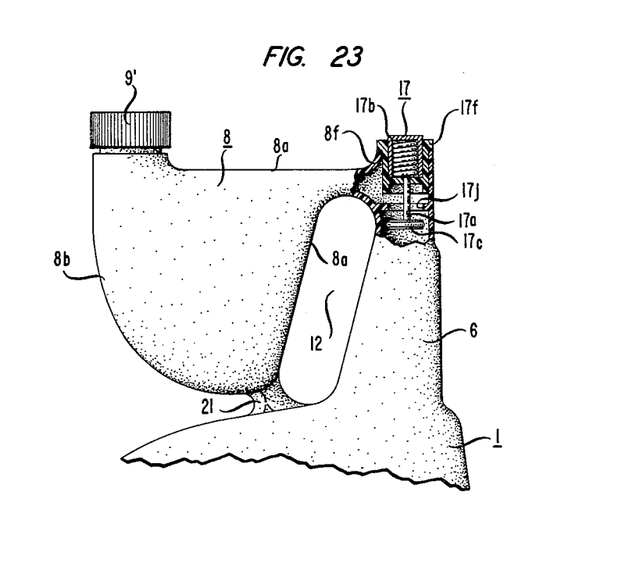
FIG. 23 shows the combination of FIG. 9 including the measuring vessel of rounded contour, the flap-valve and the pinch-valve.
Figure 24:
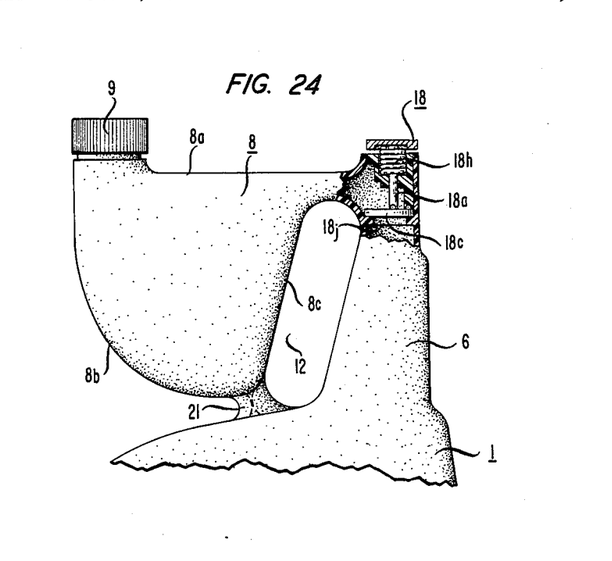
FIG. 24 shows the combination of FIG. 10 including the measuring vessel of rounded contour in which the filler opening includes a piston-valve, and a pinch-valve is interposed in the neck between the measuring vessel and the primary container.

FIGS. 21-24 show various combinations of the container and measuring vessel, as previously described, which have been modified to include the pinch-valve as well as the previously described features. FIG. 21 shows the combination including a measuring vessel 7 of triangular shape, modified to include both a piston-valve 17 in opening 7f and a pinch-valve in constriction 21. FIG. 22 shows a combination similar to FIG. 21, except that flap-valve 18 replaces piston-valve 17. FIG. 23 shows the combination including a measuring vessel 8 of rounded contour which is modified to include both a piston-valve 17 in the opening 8f and a pinch-valve in constriction 21. FIG. 24 is similar to FIG. 23, except that a flap-valve 18 has been substituted for piston-valve 17.

The present invention is not restricted to the forms shown herein by way of example, but only by the scope of the appended claims.

What is claimed is:

1. In a device for measuring fluids dispensed from a primary container having an upwardly opening mouth for pouring out fluid when said container is rotated from its reference position in a vertical plane at least through its starting pour angle, the principal axis of said primary container being substantially vertical when said container is disposed in its reference position, said device comprising in combination a measuring vessel constructed to be secured adjacent to the mouth of said primary container for measuring and dispensing a measured amount of fluid poured out from said primary container, said measuring vessel having a cross-sectional shape in said vertical plane comprising an enlarged top portion and a constricted base portion at the lower end of said measuring vessel adjacent the mouth of said primary container;

means connected to said mouth for providing a modified pour-spout for said primary container to increase the starting pour angle thereof, said means comprising a connecting tube connected in fluid-tight relation between said mouth at its lower end and the upper portion of said measuring vessel, said tube being externally spaced-apart from a lateral wall of said measuring vessel to form a handle;

said measuring vessel closed at the top except for a first opening directed to the atmosphere adjacent the top end of said connecting tube, said first opening including a removable valve;

and a second opening directed to the atmosphere which is closeable by a conventional cap, comprising a dispensing spout of said measuring vessel disposed on the opposite side of the principal axis of said primary container from said first opening.

2. The combination in accordance with claim 1 wherein said valve is manually-operable.

3. The combination in accordance with claim 2 wherein said valve is a manually-operable flap-valve.

4. The combination in accordance with claim 2 wherein said valve is a manually-operable piston-valve.

5. The combination in accordance with claim 1 or 2 wherein said measuring vessel includes at least one volumetric scale calibrated to measure the contents of said measuring vessel.

6. The combination in accordance with claim 5 wherein said at least one volumetric scale includes a first volumetric scale calibrated to measure the contents of said measuring vessel when said primary vessel is disposed in said reference position, and a second volumetric scale calibrated to measure the contents of said measuring vessel in closed condition when said container is disposed at an angle in said vertical plane which exceeds the increased starting pour angle of said primary container including said modified pour spout.

7. The combination in accordance with claim 6 wherein said at least one volumetric scale includes a third volumetric scale calibrated to measure the contents entrapped in said measuring vessel when the axis of said primary container is disposed at a clockwise angle in said vertical plane, relating to said principal axis.

8. The combination in accordance with claim 7 wherein said third volumetric scale includes remeasure calibration lines which radiate from the point in the upper end of said modifying pour spout into which fluid first flows to return to said primary container, said lines being so disposed as to intersect horizontal calibration lines on one said scale representing a series of equivalent volumes when said primary container is disposed in its reference position, and wherein said remeasure calibration lines are substantially parallel to the surface of the remaining fluid trapped in the measuring vessel when said primary container is tipped in said clockwise direction in said vertical plane at each of a progression of pour-back angles.

9. The combination in accordance with claim 2 wherein said measuring vessel is formed so that the inner surface of its lower outer wall defines a substantial concavity providing a rounded cross-section in the vertical plane.

10. In a device for measuring fluids dispensed from a primary container having an upwardly opening mouth for pouring out fluid when said container is rotated, from its reference position in a vertical plane at least through its starting pour angle, the principal axis of said primary container being substantially vertical when said container is disposed in its reference position, said device comprising in combination a measuring vessel constructed to be secured adjacent to the mouth of said primary container for measuring and dispensing a measured amount of fluid poured out from said primary container, said measuring vessel having a cross-sectional shape in said vertical plane comprising an enlarged top portion and a constricted base portion at the lower end of said measuring vessel adjacent the mouth of said primary container;

means connected to said mouth for providing a modified pour-spout for said primary container to increase the starting pour angle thereof, said means comprising a first connecting tube connected in fluid-tight relation between said mouth at its lower end and the upper portion of said measuring vessel, said tube being externally spaced-apart from a lateral wall of said measuring vessel to form a handle;

said measuring vessel closed at the top except for a first opening adjacent the top end of said connecting tube, said first opening including a removable valve;

and a second opening closeable by a conventional cap, comprising a dispensing spout of said measuring vessel disposed on the opposite side of the principal axis of said primary container from said first opening;

wherein said means comprising said connecting tube is in substantial vertical alignment with the principal axis of said primary container; and said connecting tube accommodates a second tube of smaller diameter upon removal of said valve which extends from the first opening adjacent the top end of said connecting tube and through the mouth of said primary vessel for filling said primary vessel.

11. In a device for measuring fluids dispensed from a primary container having an upwardly opening mouth for pouring out fluid when said container is rotated, from its reference position in a vertical plane at least through its starting pour angle, the principal axis of said primary container being substantially vertical when said container is disposed in its reference position, said device comprising in combination a measuring vessel constructed to be secured adjacent to the mouth of said primary container for measuring and dispensing a measured amount of fluid poured out from said primary container, said measuring vessel having a cross-sectional shape in said vertical plane comprising an enlarged top portion and a constricted base portion at the lower end of said measuring vessel adjacent the mouth of said primary container;

means connected to said mouth for providing a modified pour-spout for said primary container to increase the starting pour angle thereof, said means comprising a connecting tube connected in fluid-tight relation between said mouth at its lower end and the upper portion of said measuring vessel, said tube being externally spaced-apart from a lateral wall of said measuring vessel to form a handle;

said measuring vessel closed at the top except for a first opening adjacent the top end of said connecting tube;

and a second opening closeable by a conventional cap, comprising a dispensing spout of said measuring vessel disposed on the opposite side of the principal axis of said primary container from said first opening;

wherein the constricted portion of said measuring vessel is connected to said primary vessel through a narrow neck; and valve means is interposed in said neck for opening said neck in response to finger pressure on said neck.

12. The combination in accordance with claim 11 wherein said valve means comprises self-adhering plastic, the inner surfaces of which are compressed together in a direction substantially normal to said surfaces to form an interface providing a liquid tight seal, said seal responsive to compression in a direction substantially tangential to said interface to open.

13. A method for measuring fluids dispensed from a device comprising a primary container having an upwardly opening mouth for pouring out fluid when said container is rotated from its reference position in a vertical plane at least through its starting pour angle, the principal axis of said primary container being substantially vertical when said container is disposed in a reference position, and said device comprising in combination a measuring vessel constructed to be secured adjacent to the mouth of said primary container for measuring and dispensing a measured amount of fluid poured out from said primary container wherein said measuring vessel has a cross-sectional shape in a vertical plane comprising an enlarged top portion and a constricted base portion, and wherein said device includes means comprising a tube in the form of a handle connected at its lower end to the mouth of said primary container for providing a modified pour spout to increase the starting pour angle of said primary container connected to the upper portion of the measuring vessel said tube in the form of a handle having an opening directed to the atmosphere adjacent the top thereof;

said method of filling said primary container with fluid comprising the steps of interposing an inner removable tube through said opening at the top of said tube in the form of a handle, and through said tube in the form of a handle into said primary container; and subsequently after said primary container has been filled to a sufficient level with fluid, removing said inner removable tube and interposing a removable valve into said opening.

* * * * *